United States Patent
Chang et al.

(10) Patent No.: US 8,045,468 B2
(45) Date of Patent: Oct. 25, 2011

(54) APPARATUS AND METHOD OF DISPLAYING POWER LINE COMMUNICATION CHANNEL INFORMATION

(75) Inventors: Seung-gi Chang, Seoul (KR); Joon-hee Lee, Gunpo-si (KR); Noh-byung Park, Yongin-si (KR); In-hwan Kim, Suwon-si (KR); Ju-han Lee, Suwon-si (KR); Jun-hae Choi, Seongnam-si (KR); Ji-hoon Kim, Hwaseong-si (KR); Ho-jeong You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 794 days.

(21) Appl. No.: 11/583,854

(22) Filed: Oct. 20, 2006

(65) Prior Publication Data

US 2007/0159981 A1 Jul. 12, 2007

(30) Foreign Application Priority Data

Jan. 12, 2006 (KR) .......................... 10-2006-0003495

(51) Int. Cl.
*H04L 12/26* (2006.01)
(52) U.S. Cl. ........................................................ 370/235
(58) Field of Classification Search .................... None
See application file for complete search history.

(56) References Cited

U.S. PATENT DOCUMENTS

| | | | |
|---|---|---|---|
| 2003/0045970 A1* | 3/2003 | Maryanka | 700/293 |
| 2003/0095036 A1 | 5/2003 | Wasaki et al. | |
| 2003/0169460 A1* | 9/2003 | Liao et al. | 358/426.08 |
| 2004/0081127 A1* | 4/2004 | Gardner et al. | 370/338 |
| 2004/0219945 A1* | 11/2004 | Coffey | 455/550.1 |
| 2007/0195956 A1* | 8/2007 | Gavette | 380/277 |

FOREIGN PATENT DOCUMENTS

| | | |
|---|---|---|
| CN | 1640182 A | 7/2005 |
| EP | 1536572 A1 | 6/2005 |
| JP | 2005-143026 A | 6/2005 |
| KR | 10-2005-0040370 A | 5/2005 |

* cited by examiner

*Primary Examiner* — Raj Jain
(74) *Attorney, Agent, or Firm* — Sughrue Mion, PLLC

(57) ABSTRACT

Provided is an apparatus and method of displaying power line communication (PLC) channel information. The apparatus for displaying PLC channel information includes a channel information determining unit which performs channel estimation of a PLC channel, and, based on the channel estimation, determines channel information on the PLC channel including a bandwidth of the PLC channel which is available for a user in a PLC network; and a channel information displaying unit which displays the channel information to the user.

20 Claims, 4 Drawing Sheets

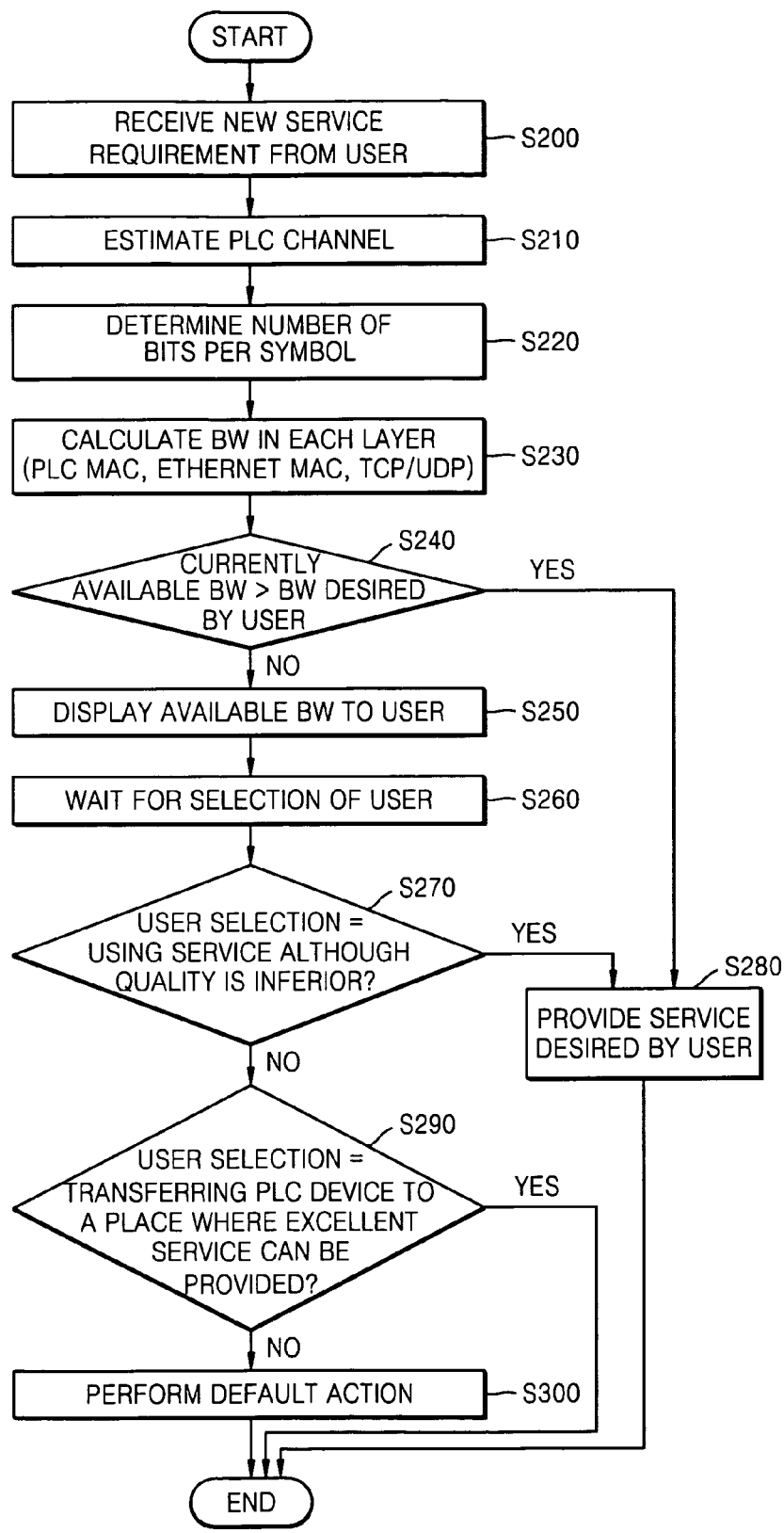

APPARATUS AND METHOD OF DISPLAYING POWER LINE COMMUNICATION CHANNEL INFORMATION

CROSS-REFERENCE TO RELATED PATENT APPLICATION

This application claims the benefit of Korean Patent Application No. 10-2006-0003495, filed on Jan. 12, 2006, in the Korean Intellectual Property Office, the disclosure of which is incorporated herein in its entirety by reference.

BACKGROUND OF THE INVENTION

1. Field of the Invention

The present invention relates to power line communication (PLC), and more particularly, to an apparatus and method of displaying channel information in a power line communication network.

2. Description of the Related Art

In some cases, it must be determined whether power line communication (PLC) can be performed between different points (for example, a point A and a point B). At this time, PLC devices are installed at the point A and the point B and then perform a communication application. By determining whether the communication is performed well by the communication application, it is determined whether the PLC can be performed between the two points A and B. Accordingly, when it is difficult to install a communication device or it takes much time and effort to execute the communication application, it takes much time and effort to find an adequate communication point.

SUMMARY OF THE INVENTION

The present invention provides an apparatus and method of displaying power line communication channel information, which can determine whether communication can be performed through a simple test before installing a power line communication device.

The present invention also provides a computer-readable medium having embodied thereon a computer program for executing a method of displaying the power line communication channel information.

According to an aspect of the present invention, there is provided an apparatus for displaying power line communication (PLC) channel information, including a channel information determining unit which performs PLC channel estimation and determines channel information including a bandwidth is available for a user in a power line communication network; and a channel information displaying unit which displays the channel information to the user.

The channel information determining unit may include a data frame transmission time determining unit which determines a data frame transmission time necessary for transmitting an entire data frame; and a layer bandwidth calculating unit which divides the size of data to be transmitted in each layer by the data frame transmission time to calculate the available bandwidth in each layer.

The data frame transmission time determining unit may include a bits-per-tone determining unit which determines the numbers of bits carried on tones through the channel estimation; a bits-per-symbol determining unit which sums up the numbers of the bits carried on the tones to determine the number of bits per symbol; a total symbol number calculating unit which divides the number of bits included in the entire data frame by the number of the bits per symbol to calculate the total number of symbols necessary for transmitting the entire data frame; and a data frame transmission time calculating unit which multiplies the total number of the symbols by a period of time necessary for transmitting one symbol to calculate the data frame transmission time.

The power line communication network may use a transmission control protocol (TCP) or a user datagram protocol (UDP). The layer bandwidth calculating unit may include a PLC media access control (MAC) bandwidth calculating unit which divides the size of data to be transmitted in a PLC MAC layer by the data frame transmission time to calculate a bandwidth in the PLC MAC layer; an Ethernet MAC bandwidth calculating unit which divides the size of data to be transmitted in an Ethernet MAC layer by the data frame transmission time to calculate a bandwidth in the Ethernet MAC layer; and a TCP/UDP bandwidth calculating unit which divides the size of data to be transmitted in a TCP layer or a UDP layer by the data frame transmission time to calculate a bandwidth in the TCP layer or the UDP layer.

The channel information displaying unit may display the channel information in a numeric form or a meter form.

The channel information may include the available bandwidth of the channel, a delay degree of the channel, and an error rate of the channel.

According to another aspect of the present invention, there is provided a method of displaying power line communication (PLC) channel information, including performing PLC channel estimation and determining channel information including a bandwidth which is available for a user in a power line communication network; and displaying the channel information to the user.

The determining of the channel information may include determining a data frame transmission time necessary for transmitting an entire data frame; and calculating the available bandwidth in each layer by dividing the size of data to be transmitted in each layer by the data frame transmission time.

The determining of the data frame transmission time may include determining the numbers of bits carried on tones through the channel estimation; summing up the numbers of the bits carried on the tones to determine the number of bits per symbol; dividing the number of bits included in the entire data frame by the number of the bits per symbol to calculate the total number of symbols necessary for transmitting the entire data frame; and multiplying the total number of the symbols by a period of time necessary for transmitting one symbol to calculate the data frame transmission time.

The power line communication network may use a transmission control protocol (TCP) or a user datagram protocol (UDP). The calculating the available bandwidth in each layer may include dividing the size of data to be transmitted in a PLC MAC layer by the data frame transmission time to calculate a bandwidth in the PLC MAC layer; dividing the size of data to be transmitted in an Ethernet MAC layer by the data frame transmission time to calculate a bandwidth in the Ethernet MAC layer; and dividing the size of data to be transmitted in a TCP layer or a UDP layer by the data frame transmission time to calculate a bandwidth in the TCP layer or the UDP layer.

The displaying of the channel information may include displaying the channel information in a numeric form or displaying the channel information in a meter form.

BRIEF DESCRIPTION OF THE DRAWINGS

The above and other features and advantages of the present invention will become more apparent by describing in detail exemplary embodiments thereof with reference to the attached drawings in which:

FIG. 5 illustrates an example of providing a desired service to a user using the apparatus and method of displaying the PLC channel information according to the embodiment of the present invention.

DETAILED DESCRIPTION OF THE INVENTION

Hereinafter, an apparatus and method of displaying power line communication (PLC) channel information according to an embodiment of the present invention will be described in detail with reference to the accompanying drawings.

Figure 1:
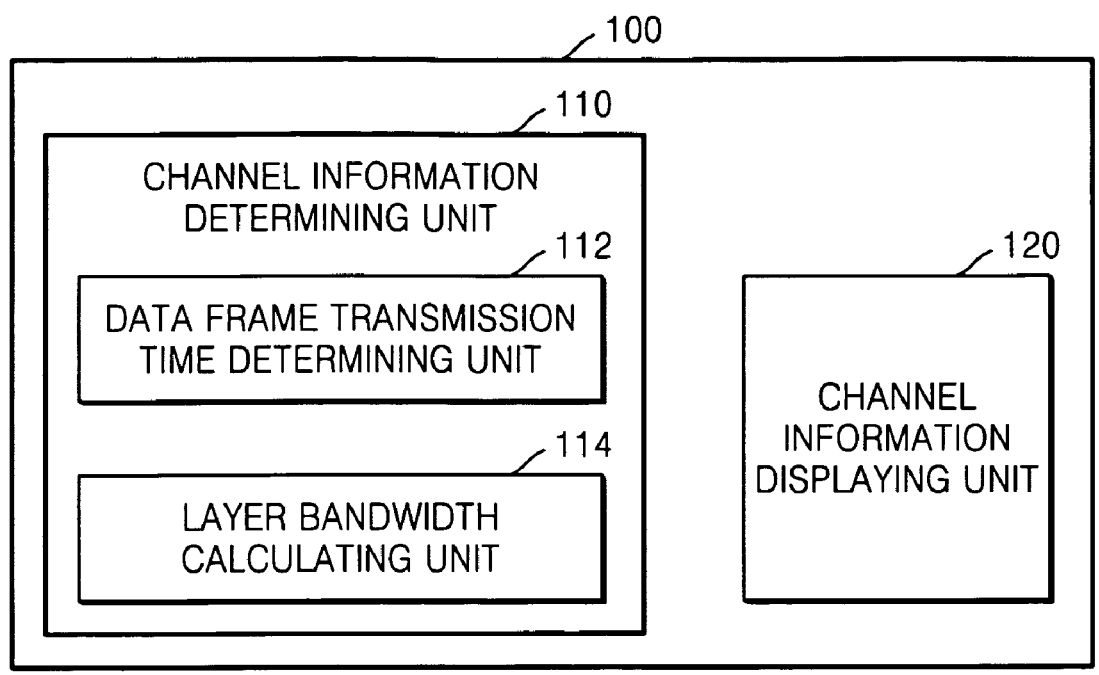
FIG. 1 is a block diagram illustrating an apparatus for displaying power line communication (PLC) channel information according to an embodiment of the present invention.

FIG. 1 is a block diagram illustrating an apparatus for displaying PLC channel information according to an embodiment of the present invention. Referring to FIG. 1, the apparatus for displaying the PLC channel information according to the present embodiment includes a channel information determining unit 110 and a channel information displaying unit 120.

The channel information determining unit 110 determines channel information through PLC channel estimation. The channel information represents a channel state and includes a bandwidth of a channel, a delay degree of a channel, an error rate of a channel, etc. The channel information determining unit 110 preferably includes a data frame transmission time determining unit 112 and a layer bandwidth calculating unit 114.

The data frame transmission time determining unit 112 determines a data frame transmission time necessary for transmitting an entire data frame through the channel estimation. The data frame transmission time determining unit 112 determines the number of bits per tone, that is, the number of bits carried on tones, through the channel estimation. Data is transmitted using a symbol. The symbol is composed of at least one tone. Accordingly, the data frame transmission time determining unit 112 sums up the numbers of the bits carried on the tones to calculate the number of bits per symbol, that is, the number of bits which can be transmitted using one symbol. Next, the data frame transmission time determining unit 112 divides the number of the bits of the data included in the entire data frame by the number L of the bits which can be transmitted using one symbol to calculate a total number of symbols necessary for transmitting the entire data frame. Finally, the data frame transmission time determining unit 112 multiplies the calculated total number of the symbols by a period of time necessary for transmitting one symbol to obtain a period of time necessary for transmitting the entire data frame.

The layer bandwidth calculating unit 114 divides the size of the data to be transmitted in each transmission layer by a data frame transmission time to calculate a bandwidth which can be used by a user. The transmission layers may include a power line communication (PLC) media access control (MAC) layer, a Ethernet MAC layer, and a transmission control protocol (TCP) or a user diagram protocol (UDP).

Figure 2:
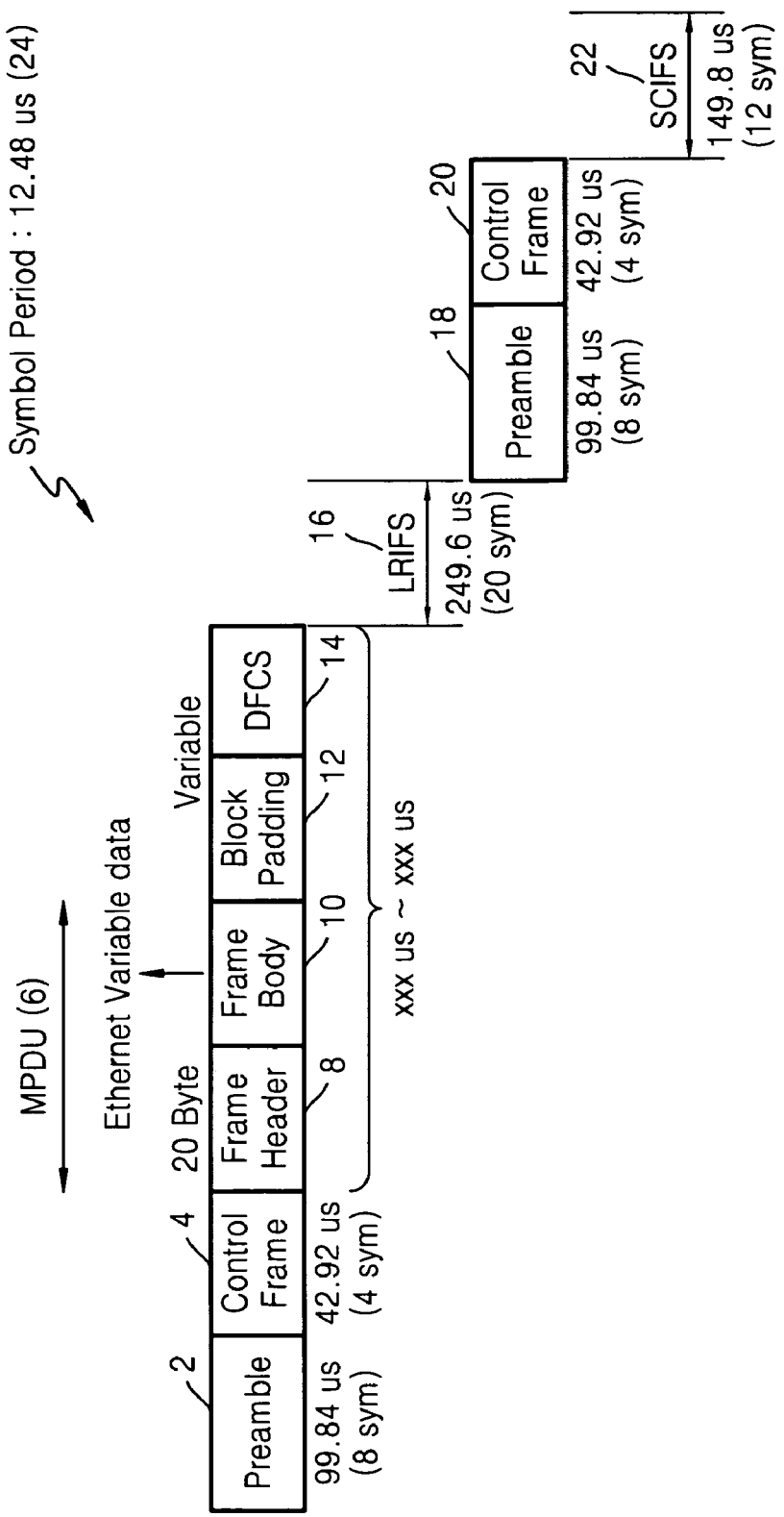
FIG. 2 illustrates an example of a data frame in a power line communication (PLC) media access control (MAC) layer.

FIG. 2 illustrates an example of a data frame in the PLC MAC layer. In FIG. 2, the data frame in the PLC MAC layer includes a preamble 2, a control frame 4, a MAC protocol data unit (MPDU) 6, a block padding 12, and a data frame check sequence (DFCS) 14. LRIFS 16 or SCIFS 22 exists between data frames. LRIFS and SCIFS are examples of inter frame space (IFS). The MPDU 6 includes a frame header 8 and a frame body 10.

The data frame is transmitted using the symbols. In FIG. 2, a period of time necessary for transmitting one symbol is 12.48 μs (24). Since the preamble 2 is composed of 8 symbols, a period of time necessary for transmitting the preamble 2 is 99.84 μs. Since the control frame 4 is composed of 4 symbols, a period of time necessary for transmitting the control frame 4 is 42.92 μs. The numbers of the data units included in the MPDU 6, the block padding 12, and the DFCS 14 are variable. Since the LRIFS 16 includes 20 symbols, the length thereof is 249.6 μs. Since the SCIFS 22 includes 12 symbols, the length thereof is 149.8 μs.

When the channel estimation is performed, the number of the bits carried on the tones using each modulation method can be obtained. When summing up the bits carried on the tones used actually, the number of the bits in one symbol can be obtained. By dividing the number of the bits included in the entire data frame by the number of bits per symbol, the total number of the symbols can be obtained. By multiplying the total number of the symbols by a period of time (in FIG. 2, 12.48 μs) necessary for transmitting one symbol, the data frame transmission time can be obtained.

A data rate in the PLC MAC layer is expressed by Equation 1.

$$\text{PLC\_MAC\_throughput} = \frac{\text{PLC\_MAC\_data\_size(bits)}}{\text{time}(\mu s)} = \text{data\_rate}(Mbps) \quad \text{Equation 1}$$

At this time, a period of time necessary for a backoff process after the IFS and an additional period must be further considered.

When a bandwidth is calculated in the Ethernet MAC layer or the TCP layer which is higher than the PLC MAC layer, the bandwidth must be calculated using the size of the data except the header in each layer.

A data rate in the Ethernet MAC layer is expressed by Equation 2.

$$\text{Ethernet\_MAC\_throughput} = \frac{\text{PLC\_MAC\_data\_size} - \text{Ethernet\_header\_size(bits)}}{\text{time}(\mu s)} \quad \text{Equation 2}$$
$$= \text{data\_rate}(Mbps)$$

The data rate in the TCP layer is expressed by Equation 3.

$$\text{TCP\_throughput} = \frac{\text{PLC\_MAC\_data\_size} - \text{Ethernet\_header\_size} - \text{TCP\_header\_size(bits)}}{\text{time}(\mu s)} \quad \text{Equation 3}$$
$$= \text{data\_rate}(Mbps)$$

Referring to Equations 1 through 3, it can be seen that the higher the layer, the lower the data rate.

The channel information displaying unit 120 displays the channel information obtained by the channel information determining unit 110 to the user. The channel information displaying unit 120 preferably includes a LED combination or a numeric display window. Examples of the channel information displaying unit 120 are illustrated in FIGS. 3 and 4.

Figure 3:
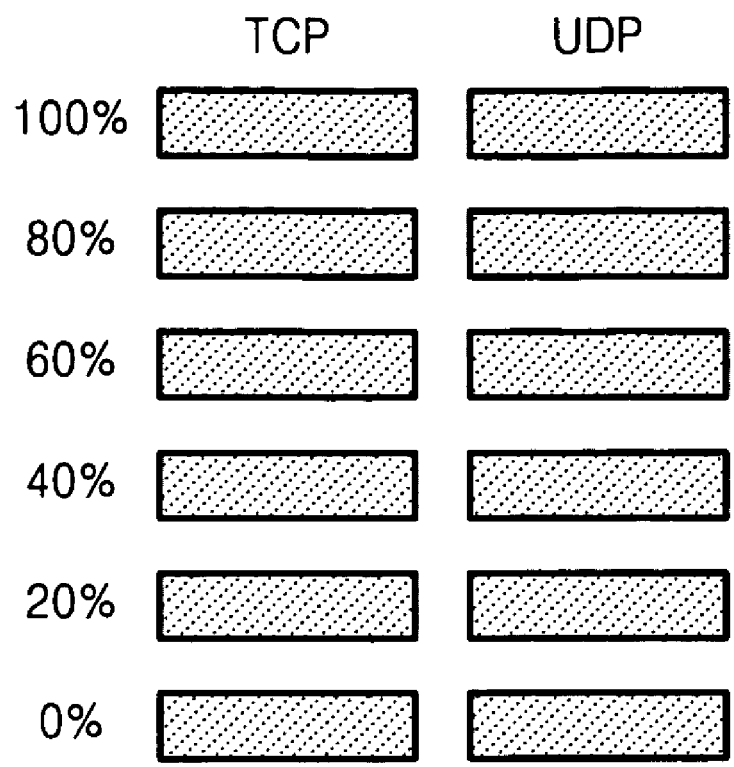
FIG. 3 illustrates an example of displaying channel information in a meter form by a LED combination.

FIG. 3 illustrates an example of displaying the channel information in a meter form by the LED combination. When a maximum bandwidth is 100% in the TCP and UDP layers, a ratio of the bandwidth which is currently available for the user is displayed in the meter form.

Figure 4:
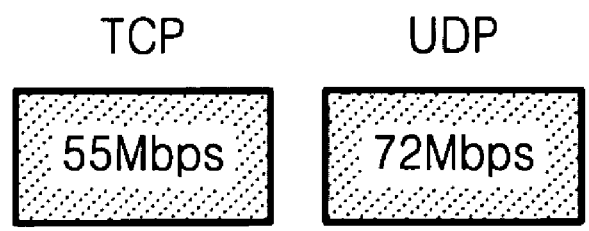
FIG. 4 illustrates an example of displaying channel information in a numeric form by a numeric display window.

FIG. 4 illustrates an example of displaying the channel information in a numeric form by the numeric display window. In FIG. 4, the bandwidth which is available in the TCP layer is 55 Mbps and the bandwidth which is available in the UDP layer is 72 Mbps.

The information which can be displayed by the channel information display unit 120 includes a bandwidth, a delay degree, an error rate, information as to whether a master or a slave exists in a master-slave structure, and information as to whether another sub-net is configured.

In the present invention, before installing the PLC device, it may be previously checked whether a channel can be used. In an application, information on kinds of a service which can be selected by the user or expected quality of the service can be previously checked.

Accordingly, the user can know whether the communication can be performed, without installing a communication device or executing a communication application which requires much time and effort. Accordingly, it is possible to reduce time and effort necessary for finding an adequate communication point.

FIG. 5 illustrates an example of providing a desired service to a user using the apparatus and method of displaying the channel information according to the embodiment of the present invention.

When a user requires a new service (S200), the apparatus for displaying the channel information performs PLC channel estimation (S210) and determines the number of bits per symbol (S220). An available bandwidth BW is calculated in each layer using the number of the bits per symbol (S230). When the calculated bandwidth BW is greater than a bandwidth desired by the user, a service desired by the user is provided (S280).

When the calculated bandwidth BW is less than the bandwidth desired by the user, a bandwidth which can be currently provided is displayed to the user (S250). Alternatively, operation 250 may be performed before operation 240.

When the currently available bandwidth BW is less than a necessary bandwidth, it waits for the selection of the user (S260). The user may select one of using the service although the quality thereof is inferior (S270) and transferring the PLC device to a place where an excellent service can be provided (S290). When the user does not select any action in a predetermined period, a default action may be performed (S300).

The present invention can be embodied in an independent device or an application program of a computer or the like.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

According to an apparatus and method of displaying power line communication channel information of the present invention, since channel information is determined through channel estimation and displayed to a user, it is possible to easily check whether a channel can be used before installing a power line communication (PLC) device. In an application, information on kinds of a service which can be selected by the user or expected quality of the service can be previously checked. Accordingly, the user can know whether the communication can be performed, without installing a communication device or executing a communication application which requires much time and effort. Accordingly, it is possible to reduce time and effort necessary for finding an adequate communication point.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for displaying power line communication (PLC) channel information, comprising:
    a channel information determining unit which performs channel estimation of a PLC channel, and, based on the channel estimation, determines channel information on the PLC channel including a bandwidth of the PLC channel between two points which is available for a user in a PLC network including the PLC channel; and
    a channel information displaying unit which displays the channel information to the user,
    wherein the channel estimation is performed before installing PLC devices on the two points.

2. The apparatus of claim 1, wherein the channel information determining unit comprises:
    a data frame transmission time determining unit which determines a data frame transmission time necessary for transmitting an entire data frame; and
    a layer bandwidth calculating unit which divides a size of data to be transmitted in each layer by the data frame transmission time to calculate the available bandwidth in each layer.

3. The apparatus of claim 2, wherein the data frame transmission time determining unit comprises:
    a bits-per-tone determining unit which determines numbers of bits carried on tones through the channel estimation;
    a bits-per-symbol determining unit which sums up the numbers of the bits carried on the tones to determine a number of bits per symbol;
    a total symbol number calculating unit which divides a number of bits included in the entire data frame by the number of the bits per symbol to calculate a total number of symbols necessary for transmitting the entire data frame; and
    a data frame transmission time calculating unit which multiplies the total number of the symbols by a period of time necessary for transmitting one symbol to calculate the data frame transmission time.

4. The apparatus of claim 2, wherein the power line communication network uses a transmission control protocol (TCP) or a user datagram protocol (UDP).

5. The apparatus of claim 4, wherein the layer bandwidth calculating unit comprises:
    a PLC media access control (MAC) bandwidth calculating unit which divides the size of data to be transmitted in a PLC MAC layer by the data frame transmission time to calculate a bandwidth in the PLC MAC layer;
    an Ethernet MAC bandwidth calculating unit which divides the size of data to be transmitted in an Ethernet MAC layer by the data frame transmission time to calculate a bandwidth in the Ethernet MAC layer; and a TCP/UDP bandwidth calculating unit which divides the size of data to be transmitted in a TCP layer or a UDP layer by the data frame transmission time to calculate a bandwidth in the TCP layer or the UDP layer.

6. The apparatus of claim 1, wherein the channel information displaying unit displays the channel information in a numeric form.

7. The apparatus of claim 1, wherein the channel information displaying unit displays the channel information in a meter form.

8. The apparatus of claim 1, wherein the channel information comprises the available bandwidth of the channel, a delay degree of the channel, and an error rate of the channel.

9. A method of displaying power line communication (PLC) channel information, comprising:
performing channel estimation of a PLC channel, and determining, based on the channel estimation, channel information on the PLC channel including a bandwidth of the PLC channel between two points which is available for a user in a PLC network including the PLC channel, using a channel information determination unit; and
displaying the channel information to the user, using a channel information displaying unit,
wherein the channel estimation is performed before installing PLC devices on the two points.

10. The method of claim 9, wherein the determining of the channel information comprises:
determining a data frame transmission time necessary for transmitting an entire data frame; and
calculating the available bandwidth in each layer by dividing a size of data to be transmitted in each layer by the data frame transmission time.

11. The method of claim 10, wherein the determining of the data frame transmission time comprises:
determining numbers of bits carried on tones through the channel estimation;
summing up the numbers of the bits carried on the tones to determine a number of bits per symbol;
dividing the number of bits included in the entire data frame by a number of the bits per symbol to calculate a total number of symbols necessary for transmitting the entire data frame; and
multiplying the total number of the symbols by a period of time necessary for transmitting one symbol to calculate the data frame transmission time.

12. The method of claim 10, wherein the power line communication network uses a transmission control protocol (TCP) or a user datagram protocol (UDP).

13. The method of claim 12, wherein the calculating the available bandwidth in each layer comprises:

dividing the size of data to be transmitted in a PLC MAC layer by the data frame transmission time to calculate a bandwidth in the PLC MAC layer;
dividing the size of data to be transmitted in an Ethernet MAC layer by the data frame transmission time to calculate a bandwidth in the Ethernet MAC layer; and
dividing the size of data to be transmitted in a TCP layer or a UDP layer by the data frame transmission time to calculate a bandwidth in the TCP layer or the UDP layer.

14. The method of claim 9, wherein the displaying of the channel information comprises displaying the channel information in a numeric form.

15. The method of claim 9, wherein the displaying of the channel information comprises displaying the channel information in a meter form.

16. The apparatus of claim 9, wherein the channel information comprises the available bandwidth of the channel, a delay degree of the channel, and an error rate of the channel.

17. A computer-readable medium having recorded thereon a computer program for executing a method of displaying power line communication (PLC) channel information, comprising:
performing PLC channel estimation and determining channel information including a bandwidth between two points which is available for a user in a power line communication network; and
displaying the channel information to the user,
wherein the channel estimation is performed before installing PLC devices on the two points.

18. The apparatus of claim 1, wherein, for the channel estimation of the PLC channel, the channel information determination unit estimates a channel state of the PLC channel with respect to data transmission time and a size of data to be transmitted in a given time which are required to calculate the bandwidth.

19. The method of claim 9, wherein the performing the channel estimation of the PLC channel comprises estimating a channel state of the PLC channel with respect to data transmission time and a size of data to be transmitted in a given time which are required to calculate the bandwidth.

20. A method of constituting a power line communication (PLC) network comprising a PLC channel between two points in the PLC network, the method comprising:
performing channel estimation of the PLC channel, and determining channel information on the PLC channel including a bandwidth of the PLC channel which is available for PLC between the two points, using a channel information determination unit; and
installing two PLC network devices on the PLC channel based on the determined channel information,
wherein the channel estimation is performed before installing PLC devices on the two points.

* * * * *